US010310605B2

(12) United States Patent
Chandy

(10) Patent No.: US 10,310,605 B2
(45) Date of Patent: Jun. 4, 2019

(54) HAPTIC FEEDBACK FOR STEERING SYSTEM CONTROLS

(71) Applicant: Steering Solutions IP Holding Corporation, Saginaw, MI (US)

(72) Inventor: Ashok Chandy, Palo Alto, CA (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 0 days.

(21) Appl. No.: 15/351,752

(22) Filed: Nov. 15, 2016

(65) Prior Publication Data
US 2018/0136727 A1 May 17, 2018

(51) Int. Cl.
*B62D 1/04* (2006.01)
*G06F 3/01* (2006.01)

(52) U.S. Cl.
CPC ............. *G06F 3/016* (2013.01); *B62D 1/046* (2013.01)

(58) Field of Classification Search
CPC ........ G06F 3/016; G06F 3/017; G06F 3/0414; G06F 2203/04101; B62D 1/046; B62D 1/06; B62D 1/08; B60W 50/16; B60K 2350/928; B60K 2350/1036; B60K 2350/1052
USPC ..... 340/407.1, 407.2, 573.1; 345/173; 701/1
See application file for complete search history.

(56) References Cited

U.S. PATENT DOCUMENTS

| 4,315,117 A | 2/1982 | Kokubo et al. |
| 4,337,967 A | 7/1982 | Yoshida et al. |
| 4,503,300 A | 3/1985 | Lane, Jr. |
| 4,503,504 A | 3/1985 | Suzumura et al. |
| 4,561,323 A | 12/1985 | Stromberg |
| 4,691,587 A | 9/1987 | Farrand et al. |
| 4,836,566 A | 6/1989 | Birsching |
| 4,921,066 A | 5/1990 | Conley |
| 4,962,570 A | 10/1990 | Hosaka et al. |
| 4,967,618 A | 11/1990 | Matsumoto et al. |
| 4,976,239 A | 12/1990 | Hosaka |
| 5,240,284 A | 8/1993 | Takada et al. |
| 5,295,712 A | 3/1994 | Omura |
| 5,319,803 A | 6/1994 | Allen |

(Continued)

FOREIGN PATENT DOCUMENTS

| CN | 1722030 | 1/2006 |
| CN | 1736786 | 2/2006 |

(Continued)

OTHER PUBLICATIONS

China Patent Application No. 201510204221.5 Second Office Action dated Mar. 10, 2017, 8 pages.

(Continued)

*Primary Examiner* — Hung T Nguyen
(74) *Attorney, Agent, or Firm* — Cantor Colburn LLP

(57) ABSTRACT

A system for haptic feedback for steering system controls includes a touch sensor input detection module and an actuator haptic response driver module. The touch sensor input detection module acquires a touch sensor input from one or more touch sensors of a steering system and identifies a touch gesture type of the touch sensor input. The actuator haptic response driver module determines a desired haptic feedback associated with the touch gesture type and controls a steering system actuator to produce a haptic response based on the desired haptic feedback.

17 Claims, 6 Drawing Sheets

(56) References Cited

U.S. PATENT DOCUMENTS

| | | |
|---|---|---|
| 5,469,356 A | 11/1995 | Hawkins et al. |
| 5,488,555 A | 1/1996 | Asgari et al. |
| 5,618,058 A | 4/1997 | Byon |
| 5,668,721 A | 9/1997 | Chandy |
| 5,690,362 A | 11/1997 | Peitsmeier et al. |
| 5,765,116 A | 6/1998 | Wilson-Jones et al. |
| 5,893,580 A | 4/1999 | Hoagland et al. |
| 5,911,789 A | 6/1999 | Keipert et al. |
| 6,070,686 A | 6/2000 | Pollmann |
| 6,138,788 A | 10/2000 | Bohner et al. |
| 6,170,862 B1 | 1/2001 | Hoagland et al. |
| 6,212,453 B1 | 4/2001 | Kawagoe et al. |
| 6,227,571 B1 | 5/2001 | Sheng et al. |
| 6,256,561 B1 | 7/2001 | Asanuma |
| 6,301,534 B1 | 10/2001 | McDermott, Jr. et al. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,481,526 B1 | 11/2002 | Millsap et al. |
| 6,575,263 B2 | 6/2003 | Hjelsand et al. |
| 6,578,449 B1 | 6/2003 | Anspaugh et al. |
| 6,598,695 B1 | 7/2003 | Menjak et al. |
| 6,611,745 B1 | 8/2003 | Paul |
| 6,612,392 B2 | 9/2003 | Park et al. |
| 6,612,393 B2 | 9/2003 | Bohner et al. |
| 6,778,890 B2 | 8/2004 | Shimakage et al. |
| 6,799,654 B2 | 10/2004 | Menjak et al. |
| 6,817,437 B2 | 11/2004 | Magnus et al. |
| 6,819,990 B2 | 11/2004 | Ichinose |
| 6,820,713 B2 | 11/2004 | Menjak et al. |
| 6,889,792 B1 | 5/2005 | Fardoun et al. |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,150,581 B2 | 4/2012 | Iwazaki et al. |
| 8,170,725 B2 | 5/2012 | Chin et al. |
| 8,170,751 B2 | 5/2012 | Lee et al. |
| 8,260,482 B1 | 9/2012 | Szybalski et al. |
| 8,352,110 B1 | 1/2013 | Szybalski et al. |
| 8,374,743 B2 | 2/2013 | Salinger |
| 8,452,492 B2 | 5/2013 | Buerkle et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,632,096 B1 * | 1/2014 | Quinn .................. B62D 7/222 188/267.1 |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,725,230 B2 | 5/2014 | Lisseman et al. |
| 8,798,852 B1 | 8/2014 | Chen et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,915,164 B2 | 12/2014 | Moriyama |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,159,221 B1 * | 10/2015 | Stantchev .............. G08C 17/02 |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,207,856 B2 | 12/2015 | Imai |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 * | 1/2016 | Lathrop ................ B60K 37/06 |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,315,210 B2 | 4/2016 | Sears et al. |
| 9,333,983 B2 | 5/2016 | Lathrop et al. |
| 9,360,865 B2 | 6/2016 | Yopp |
| 9,714,036 B2 | 7/2017 | Yamaoka et al. |
| 9,725,098 B2 | 8/2017 | Abou-Nasr et al. |
| 9,810,727 B2 | 11/2017 | Kandler et al. |
| 9,845,109 B2 | 12/2017 | George et al. |
| 9,852,752 B1 | 12/2017 | Cullinane et al. |
| 9,868,449 B1 | 1/2018 | Holz et al. |
| 10,040,330 B2 | 8/2018 | Anderson |
| 10,137,929 B2 | 11/2018 | Aoki et al. |
| 2002/0016661 A1 | 2/2002 | Frediani et al. |
| 2003/0046012 A1 | 3/2003 | Yamaguchi |
| 2003/0094330 A1 | 5/2003 | Boloorchi et al. |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0099468 A1 | 5/2004 | Chernoff et al. |
| 2004/0129098 A1 | 7/2004 | Gayer et al. |
| 2004/0133330 A1 | 7/2004 | Ono et al. |
| 2004/0182640 A1 | 9/2004 | Katou et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0155809 A1 | 7/2005 | Krzesicki et al. |
| 2005/0197746 A1 | 9/2005 | Pelchen et al. |
| 2005/0275205 A1 | 12/2005 | Ahnafield |
| 2006/0224287 A1 | 10/2006 | Izawa et al. |
| 2006/0244251 A1 | 11/2006 | Muller |
| 2006/0271348 A1 | 11/2006 | Rossow et al. |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito et al. |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |

(56) References Cited

U.S. PATENT DOCUMENTS

| | | |
|---|---|---|
| 2009/0024278 A1 | 1/2009 | Kondo et al. |
| 2009/0189373 A1 | 7/2009 | Schramm et al. |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0250081 A1 | 9/2010 | Kinser et al. |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0224876 A1 | 9/2011 | Paholics et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0150388 A1* | 6/2012 | Boissonnier ........... B62D 1/046 701/41 |
| 2012/0197496 A1 | 8/2012 | Limpibunterng et al. |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0325202 A1 | 1/2013 | Howard et al. |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0253765 A1 | 9/2013 | Bolourchi et al. |
| 2013/0292955 A1 | 11/2013 | Higgins et al. |
| 2014/0012469 A1 | 1/2014 | Kunihiro et al. |
| 2014/0028008 A1 | 1/2014 | Stadler et al. |
| 2014/0046542 A1 | 2/2014 | Kauffman et al. |
| 2014/0046547 A1 | 2/2014 | Kaufmann et al. |
| 2014/0070933 A1 | 3/2014 | Gautama et al. |
| 2014/0111324 A1 | 4/2014 | Lisseman et al. |
| 2014/0300479 A1 | 4/2014 | Wolter et al. |
| 2014/0152551 A1 | 6/2014 | Mueller et al. |
| 2014/0156107 A1* | 6/2014 | Karasawa .......... G01C 21/3664 701/1 |
| 2014/0168061 A1 | 6/2014 | Kim |
| 2014/0172231 A1 | 6/2014 | Terada et al. |
| 2014/0277896 A1 | 9/2014 | Lathrop et al. |
| 2014/0277945 A1 | 9/2014 | Chandy |
| 2014/0303827 A1 | 10/2014 | Dolgov et al. |
| 2014/0306799 A1 | 10/2014 | Ricci |
| 2014/0309816 A1 | 10/2014 | Stefan et al. |
| 2014/0354568 A1* | 12/2014 | Andrews ................ G06F 3/016 345/173 |
| 2015/0002404 A1 | 1/2015 | Hooton |
| 2015/0006033 A1 | 1/2015 | Sekiya |
| 2015/0014086 A1 | 1/2015 | Eisenbarth |
| 2015/0032322 A1 | 1/2015 | Wimmer |
| 2015/0032334 A1* | 1/2015 | Jang ...................... B62D 1/046 701/42 |
| 2015/0051780 A1 | 1/2015 | Hahne |
| 2015/0120142 A1 | 1/2015 | Park et al. |
| 2015/0060185 A1 | 3/2015 | Feguri |
| 2015/0120124 A1 | 4/2015 | Bartels et al. |
| 2015/0120141 A1 | 4/2015 | Lavoie et al. |
| 2015/0246673 A1 | 4/2015 | Tseng et al. |
| 2015/0123947 A1 | 5/2015 | Jubner et al. |
| 2015/0149035 A1 | 5/2015 | Enthaler et al. |
| 2015/0210273 A1 | 7/2015 | Kaufmann et al. |
| 2015/0251666 A1 | 7/2015 | Attard et al. |
| 2015/0283998 A1 | 9/2015 | Lind et al. |
| 2015/0324111 A1 | 9/2015 | Jubner et al. |
| 2015/0314804 A1 | 11/2015 | Aoki et al. |
| 2015/0338849 A1 | 11/2015 | Nemec et al. |
| 2016/0001781 A1 | 1/2016 | Fung et al. |
| 2016/0009332 A1 | 1/2016 | Sirbu |
| 2016/0071418 A1 | 3/2016 | Oshida et al. |
| 2016/0075371 A1 | 3/2016 | Varunjikar et al. |
| 2016/0082867 A1 | 3/2016 | Sugioka et al. |
| 2016/0200246 A1 | 3/2016 | Lisseman et al. |
| 2016/0185387 A1 | 6/2016 | Kuoch |
| 2016/0200343 A1 | 6/2016 | Lisseman et al. |
| 2016/0200344 A1 | 7/2016 | Sugioka et al. |
| 2016/0207536 A1 | 7/2016 | Yamaoka et al. |
| 2016/0207538 A1 | 7/2016 | Urano et al. |
| 2016/0209841 A1 | 7/2016 | Yamaoka et al. |
| 2016/0229450 A1 | 7/2016 | Basting et al. |
| 2016/0231743 A1 | 7/2016 | Bendewald et al. |
| 2016/0244070 A1 | 8/2016 | Bendewald et al. |
| 2016/0347347 A1 | 8/2016 | Lubischer |
| 2016/0347348 A1 | 8/2016 | Lubischer |
| 2016/0280251 A1 | 9/2016 | George et al. |
| 2016/0288825 A1 | 10/2016 | Varunjikar et al. |
| 2016/0291862 A1* | 10/2016 | Yaron .................... B60K 37/06 |
| 2016/0318540 A1 | 11/2016 | King |
| 2016/0318542 A1 | 11/2016 | Pattok et al. |
| 2016/0355207 A1 | 12/2016 | Urushibata |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0364003 A1 | 12/2016 | O'Brien |
| 2016/0368522 A1 | 12/2016 | Lubischer et al. |
| 2016/0375860 A1 | 12/2016 | Lubischer |
| 2016/0375923 A1 | 12/2016 | Schulz |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0066473 A1 | 3/2017 | Yu et al. |
| 2017/0101032 A1 | 4/2017 | Sugioka et al. |
| 2017/0101127 A1 | 4/2017 | Varunjikar et al. |
| 2017/0113712 A1 | 4/2017 | Watz |
| 2017/0151950 A1 | 6/2017 | Lien |
| 2017/0151977 A1 | 6/2017 | Varunjikar et al. |
| 2017/0151978 A1 | 6/2017 | Oya et al. |
| 2017/0158055 A1* | 6/2017 | Kim ..................... B60Q 1/0082 |
| 2017/0158222 A1 | 6/2017 | Schulz et al. |
| 2017/0166222 A1 | 6/2017 | James |
| 2017/0203785 A1 | 7/2017 | Naik et al. |
| 2017/0225704 A1 | 8/2017 | Urushibata |
| 2017/0232998 A1 | 8/2017 | Ramanujam et al. |
| 2017/0240204 A1 | 8/2017 | Raad et al. |
| 2017/0242428 A1 | 8/2017 | Pal et al. |
| 2017/0293306 A1 | 10/2017 | Riefe et al. |
| 2017/0297606 A1 | 10/2017 | Kim et al. |
| 2017/0305425 A1 | 10/2017 | Xing |
| 2017/0305458 A1 | 10/2017 | Wang et al. |
| 2017/0334458 A1 | 11/2017 | Sato et al. |
| 2018/0015948 A1 | 1/2018 | Varunjikar et al. |
| 2018/0017968 A1 | 1/2018 | Zhu et al. |
| 2018/0029632 A1 | 2/2018 | Bodtker |
| 2018/0059661 A1 | 3/2018 | Sato et al. |
| 2018/0059662 A1 | 3/2018 | Sato et al. |
| 2018/0072341 A1 | 3/2018 | Schulz et al. |
| 2018/0093700 A1 | 4/2018 | Chandy |
| 2018/0105198 A1 | 4/2018 | Bodtker et al. |
| 2018/0107214 A1 | 4/2018 | Chandy |
| 2018/0148087 A1 | 5/2018 | Wang et al. |
| 2018/0297555 A1 | 10/2018 | Simon et al. |

FOREIGN PATENT DOCUMENTS

| | | |
|---|---|---|
| CN | 101037117 | 9/2007 |
| CN | 101041355 | 9/2007 |
| CN | 101596903 | 12/2009 |
| CN | 102027458 A | 4/2011 |
| CN | 102320324 A | 1/2012 |
| CN | 102452391 | 5/2012 |
| CN | 202563346 U | 11/2012 |
| CN | 102939474 A | 2/2013 |

(56) References Cited

FOREIGN PATENT DOCUMENTS

| | | |
|---|---|---|
| CN | 103419840 | 12/2013 |
| CN | 103448785 A | 12/2013 |
| CN | 103677253 A | 3/2014 |
| CN | 103777632 A | 5/2014 |
| CN | 103818386 A | 5/2014 |
| CN | 104968554 | 10/2015 |
| DE | 19523214 A1 | 1/1997 |
| DE | 19923012 | 11/2000 |
| DE | 10212782 A1 | 10/2003 |
| DE | 102005032528 | 1/2007 |
| DE | 102005056438 A1 | 6/2007 |
| DE | 102006025254 | 12/2007 |
| DE | 102008057313 | 10/2009 |
| DE | 102010025197 A1 | 12/2011 |
| DE | 102011056042 A1 | 6/2013 |
| DE | 102014204855 A1 | 9/2014 |
| DE | 102013110865 A1 | 4/2015 |
| DE | 102014223128 A1 | 5/2016 |
| EP | 1559630 A2 | 8/2005 |
| EP | 1783719 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 | 5/2005 |
| FR | 3016327 A1 | 7/2015 |
| JP | S60157963 A | 8/1985 |
| JP | S60164629 A | 8/1985 |
| JP | H05162652 | 6/1993 |
| JP | 2768034 B2 | 6/1998 |
| JP | 2007253809 A | 10/2007 |
| JP | 2011043884 A | 3/2011 |
| JP | 20174099 A | 1/2017 |
| KR | 20100063433 A | 6/2010 |
| WO | 0147762 A1 | 7/2001 |
| WO | 2006099483 A1 | 9/2006 |
| WO | 2007034567 A1 | 3/2007 |
| WO | 2010082394 A1 | 7/2010 |
| WO | 2010116518 | 10/2010 |
| WO | 2013101058 A1 | 7/2013 |

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "FUndamentals of Vehicla Dynamics"; Society of Automotive Engineers, Inc.; published 1992; 294 pages.
Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.
Partial European Search Report for related European Patent Application No. 14156903.8, dated Sep. 23, 2014, 6 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.
Varunjikar, Tejas; Design of Horizontal Curves With DownGrades Using Low-Order Vehicle Dynamics Models; A Theisis by T. Varunkikar; 2011; 141 pages.
CN Patent Application No. 201610575225.9 First Office Action dated Jan. 22, 2018, 10 pages.
English Translation of Chinese Office Action and Search Report for Chinese Application No. 201210599006.6 dated Jan. 27, 2015, 9 pages.
English Translation of Chinese Office Action and Search Report for Chinese Application No. 201310178012.9 dated Apr. 13, 2015, 13 pages.
English Translation of Chinese Office Action and Search Report for Chinese Application No. 201410089167.X dated Feb. 3, 2016, 9 pages.
English Translation of Chinese Office Action and Search Report for Chinese Application No. 2016103666609.X dated Dec. 20, 2017, 8 pages.
European Search Report for European Patent Application No. 14156903.8 dated Jan. 27, 2015, 10 pages.
English Translation of Chinese Office Action and Search Report for Chinese Application No. 201610832736.4 dated Mar. 22, 2018, 6 pages.
Chinese Office Action and Search Report from the Chinese Patent Office for CN Application No. 201610575225.9 dated Oct. 16, 2018, 19 pages, English Translation Included.
Chinese Office Action and Search Report from the Chinese Patent Office for CN Application No. 201611096572.X dated Aug. 1, 2018, 20 pages, English Translation Included.
Chinese Office Action from the Chinese Patent Office for CN Application No. 2017102318205 dated Oct. 12, 2018, 7 pages, English Translation Only.
Chinese Office Action from the CN Patent Office for CN Application No. 201610832736.4 dated Oct. 16, 2018, 18 pages, English Translation Included.
Yan, et al., "EPS Control Technology Based on Road Surface Conditions," Jun. 22-25, 2009, pp. 933-938, 2009 IEEE International Conference on Information and Automation.
English Translation of German Office Action for German Application No. 102017126603.8 dated Mar. 31, 2019, 7 pages.

\* cited by examiner

HAPTIC FEEDBACK FOR STEERING SYSTEM CONTROLS

BACKGROUND OF THE INVENTION

Flat screens with touch detection are becoming more common in modern vehicles to accommodate flexibility to provide a human-machine interface with a large number of control functions. A center console of a vehicle is the typical location for such interfaces. Touch screen controls typically lack the tactile feedback of a traditional mechanical switch, so the user has to look and confirm that a requested action was registered by waiting for a visual cue. This can result in distracting the driver, as the driver is required to remove a hand from the vehicle steering wheel and focus attention briefly away from the road.

Some touch screens can simulate the feel of a push button switch by adding an actuator directly behind the display surface. Such an additional actuators incorporated with the display add cost, weight, and complexity. Actuator feedback can assist a user by providing an indication that pressing of a virtual push button was detected. Incorporating additional actuators may not be feasible in certain designs, and the feedback response can be limited to certain gestures on a touch screen.

SUMMARY OF THE INVENTION

A system for haptic feedback for steering system controls includes a touch sensor input detection module and an actuator haptic response driver module. The touch sensor input detection module acquires a touch sensor input from one or more touch sensors of a steering system and identifies a touch gesture type of the touch sensor input. The actuator haptic response driver module determines a desired haptic feedback associated with the touch gesture type and controls a steering system actuator to produce a haptic response based on the desired haptic feedback.

A steering system includes one or more touch sensors, a steering system actuator, and a control module. The control module is operable to acquire a touch sensor input from the one or more touch sensors, identify a touch gesture type of the touch sensor input, determine a desired haptic feedback associated with the touch gesture type, and control the steering system actuator to produce a haptic response based on the desired haptic feedback.

A method for haptic feedback for steering system controls includes acquiring, by a control module, a touch sensor input from one or more touch sensors of a steering system. A touch gesture type of the touch sensor input is identified. A desired haptic feedback associated with the touch gesture type is determined. A steering system actuator is controlled to produce a haptic response based on the desired haptic feedback.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
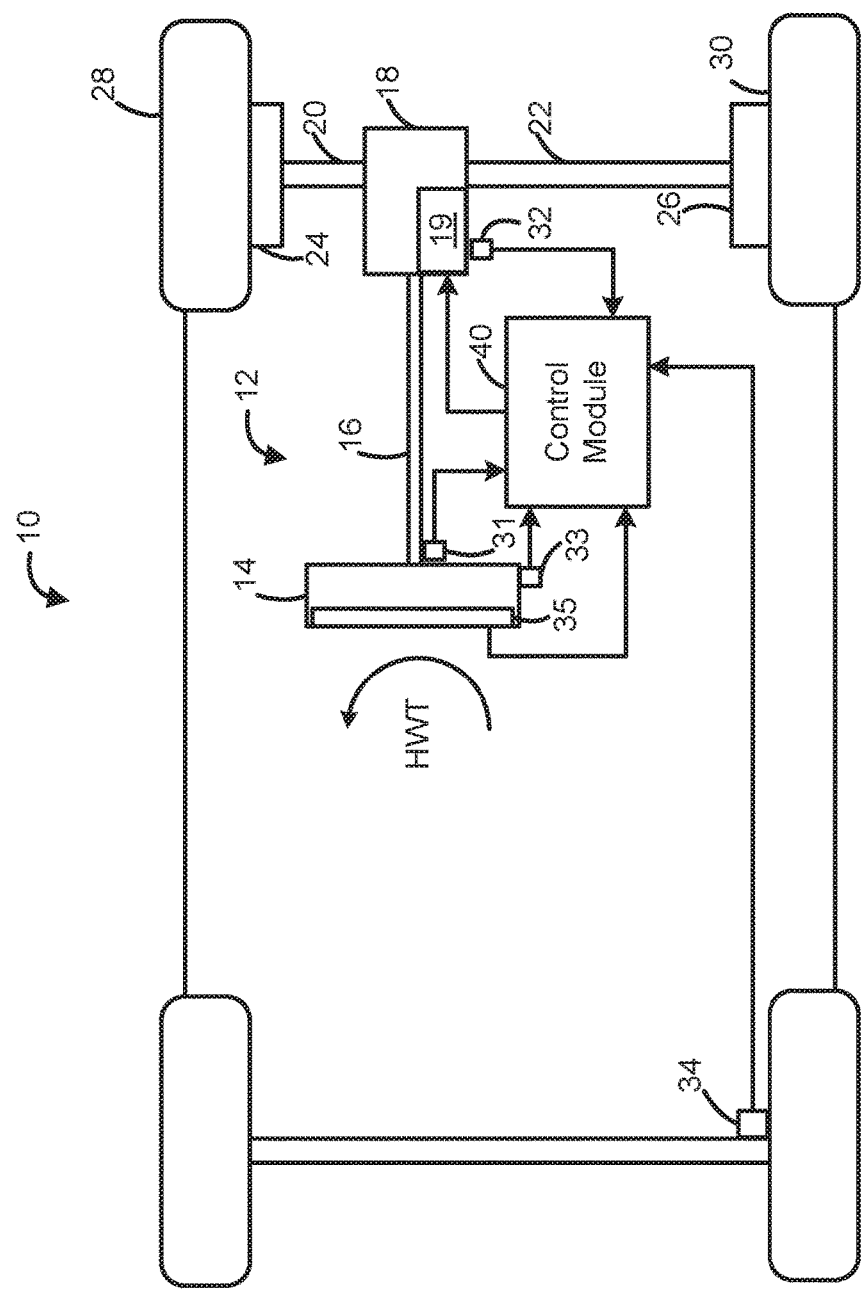
FIG. 1 illustrates a functional block diagram of a vehicle including a steering system in accordance with some embodiments.

Referring now to the Figures, where the invention will be described with reference to specific embodiments, without limiting the same, an exemplary embodiment of a vehicle 10 including a steering system 12 is illustrated. In various embodiments, the steering system 12 includes a handwheel 14 coupled to a steering shaft 16. In the exemplary embodiment shown, the steering system 12 is an electric power steering (EPS) system that further includes a steering assist unit 18 that couples to the steering shaft 16 of the steering system 12 and to a left tie rod 20 and a right tie rod 22 of the vehicle 10. The steering assist unit 18 includes, for example, a rack and pinion steering mechanism (not shown) that may be coupled through the steering shaft 16 to a steering actuator motor 19 and gearing. During operation, as the handwheel 14 is turned by a vehicle operator, the steering actuator motor 19 provides the assistance to move the left tie rod 20 and the right tie rod 22 which in turn moves left and right steering knuckles 24, 26, respectively. The left knuckle 24 is coupled to a left roadway wheel 28, and the right knuckle 26 is coupled to a right roadway wheel 30 of the vehicle 10.

As shown in FIG. 1, the vehicle 10 further includes various sensors 31-35 that detect and measure signals of the steering system 12 and/or the vehicle 10. The sensors 31-35 generate sensor signals based on the measured/observed signals. In one embodiment, a handwheel torque sensor 31 is provided for sensing a torque placed on the handwheel 14. In the exemplary embodiment as shown, the handwheel torque sensor 31 is placed on the handwheel 14, however it is to be understood that the handwheel torque sensor 31 may not always be placed near or on the handwheel 14. In one embodiment, a motor position/velocity sensor 32 senses motor position and/or velocity, and a handwheel position/velocity sensor 33 senses handwheel position and/or velocity. In addition, the vehicle 10 may include a wheel speed sensor 34 to assist in measuring vehicle speed. In some embodiments, one or more handwheel touch sensors 35 measure a grip force or pressure on the handwheel 14 at various locations that be detected as an area of contact with the handwheel 14, a width of contact with the handwheel 14, a force of contact with the handwheel 14, and/or a position of contact with the handwheel 14. Data from one or more handwheel touch sensors 35 can include magnitude in combination with position such that a touch location and touch gesture type (e.g., a tapping motion, a sliding motion, etc.) can be determined.

A control module 40 controls the operation of the steering system 12 based on one or more of the sensor signals and further based on the steering control systems and methods of the present disclosure. The control module 40 generates a command signal to control the steering actuator motor 19 of the steering system 12 based on one or more of the inputs and further based on the steering control systems and methods of the present disclosure.

Figure 2:
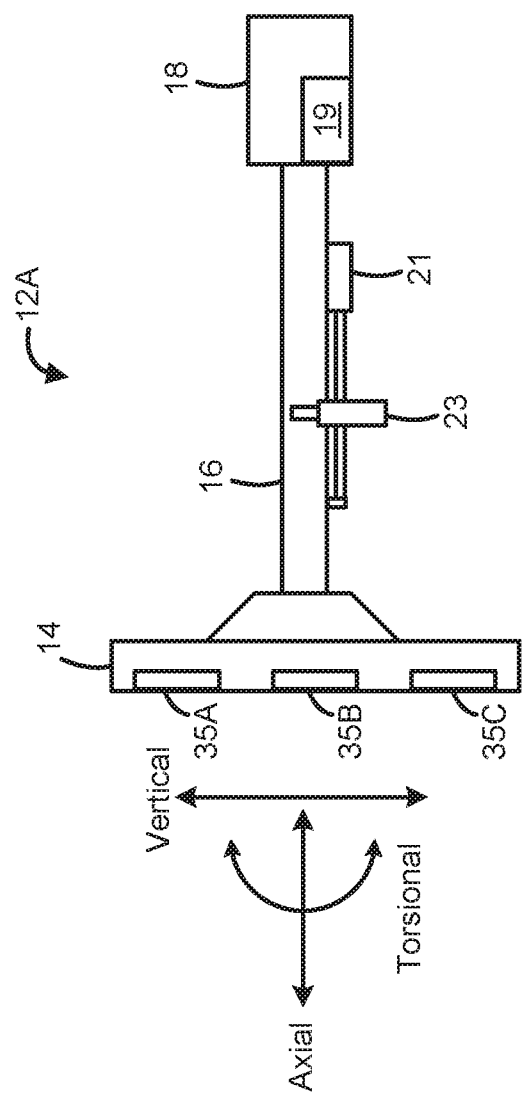
FIG. 2 illustrates a functional block diagram of a portion of a steering system in accordance with some embodiments.

FIG. 2 illustrates a functional block diagram of a portion of a steering system 12A as an alternate embodiment of the steering system 12 of FIG. 1. The example of FIG. 2 depicts multiple instances of the handwheel touch sensors 35 of FIG. 1 as handwheel touch sensors 35A, 35B, and 35C distributed at different locations on the handwheel 14. Embodiments can include one or more instances of the handwheel touch sensors 35. Various touch gesture types at specific touch locations (e.g. handwheel touch sensors 35A-35C) can result in different haptic feedback by one or more steering system actuators, such as steering actuator motor 19, telescope actuator 21, and rake actuator 23. The steering actuator motor 19 of the steering assist unit 18 is typically used to provide electronic power steering torsional force assistance. The telescope actuator 21 is typically used to axially adjust the handwheel 14 closer or further away from the driver. The rake actuator 23 is typically used to vertically adjust/tilt the handwheel 14 for driver comfort. Embodiments use one or more of the existing actuators 19, 21, and 23 to provide haptic feedback to touch sensor inputs from one or more of the touch sensors 35.

In some embodiments, the rake actuator 23 and the telescope actuator 21 can be used in conjunction with the touch sensors 35 to support various adjustments, as well as provide haptic feedback, in response to detecting one or more motions. In one embodiment, one or more of the touch sensors 35 can be used, for example, to indicate when the driver would like to adjust the rake actuator 23 by swiping a finger in a vertical direction, e.g., swipe up for rake up and swipe down for rake down movement by the rake actuator 23. Raking can be stopped upon detecting another motion by one or more of the touch sensors 35, such as a tapping motion (e.g., single tap, double tap, or the like) when the rake actuator 23 is at the desired position. To adjust the telescope position using the telescope actuator 21, the driver may swipe one or more of the touch sensors 35. The telescope actuator 21 can be stopped upon detecting another motion by one or more of the touch sensors 35, such as a tapping motion (e.g., single tap, double tap, or the like).

Other examples of functions that can be controlled using one or more of the touch sensors 35 include replacing or enhancing many of the controls that are typically provided with steering wheel switches or center stack touch screens and switches. Examples include entertainment system controls, vehicle information/configuration controls, answering phone calls, navigation controls, cruise control, heating/cooling controls, and the like.

Figure 3:
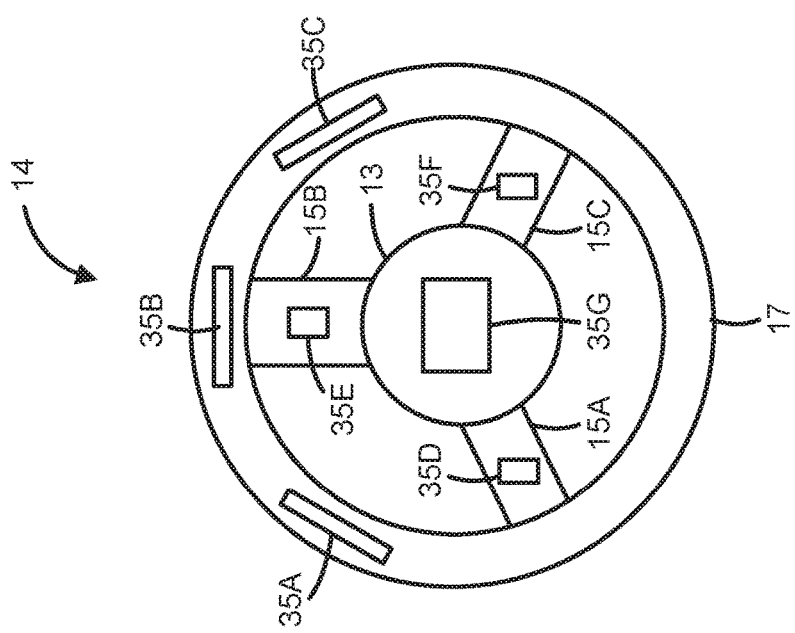
FIG. 3 illustrates a front view of a handwheel of a steering system in accordance with some embodiments.

FIG. 3 illustrates a front view of a handwheel 14 of a steering system, such as steering system 12, 12A of FIGS. 1-2 according to an embodiment. In the example of FIG. 3, handwheel touch sensors 35A, 35B, and 35C are mounted on a rim 17 of the handwheel 14, and thus may be referred to as handwheel rim-mounted touch sensors. Handwheel touch sensors 35D, 35E, and 35F are mounted on spokes 15A, 15B, and 15C respectively of the handwheel 14, and thus may be referred to as handwheel spoke-mounted touch sensors. A handwheel touch sensor 35G is mounted to a hub 13 of the handwheel 14, and thus may be referred to as a handwheel hub-mounted touch sensor. In some embodiments, the handwheel touch sensor 35G can be incorporated in a stationary hub design. The combination of handwheel touch sensors 35A-35G can allow for control input to be received in many forms and directions, which can result in different haptic feedback responses. For example, a tap on handwheel touch sensors 35A or 35C-35G can result in axial haptic feedback as an axial acceleration to be output by the telescope actuator 21 of FIG. 2, while a tap on handwheel touch sensor 35B (located at the twelve o'clock position on handwheel 14) can result in vertical haptic feedback as a vertical acceleration to be output by the rake actuator 23 of FIG. 2. A sliding motion across one or more of the handwheel touch sensors 35A-35C along the rim 17 can result in torsional haptic feedback as a torsional acceleration to be output by the steering actuator motor 19 of FIGS. 1 and 2. Some gestures can invoke a simultaneous or sequenced response from a combination of the actuators 19, 21, and/or 23. Further, the magnitude of response, frequency of response, and/or duration of response can vary, for instance, depending on the amount of force applied, rate of movement, and/or duration of a gesture applied to the handwheel touch sensors 35A-35G.

Embodiments link the type of input with appropriate haptic feedback. For example, a haptic response to a steering wheel spoke 15 tap in the vertical direction can be a torsional haptic response. A vertical tap on the top of the steering wheel rim 17 can result in a vertical haptic response from the rake actuator 23. Haptic feedback can be synthesized using knowledge of actuator plant dynamics (e.g., responses of the steering actuator motor 19, the telescope actuator 21 and/or the rake actuator 23 through various transmission elements). This assists to ensure that the feedback is natural. For example, if there is a need to get a haptic feedback like a button click, the acceleration profiles are sensed at the hand, but generated at the telescope actuator 21 and/or the rake actuator 23 that are several mechanical transmission paths removed. Modeling the actuator dynamics of the steering actuator motor 19, the telescope actuator 21 and/or the rake actuator 23 enables achieving a desired haptic response.

Figure 4:
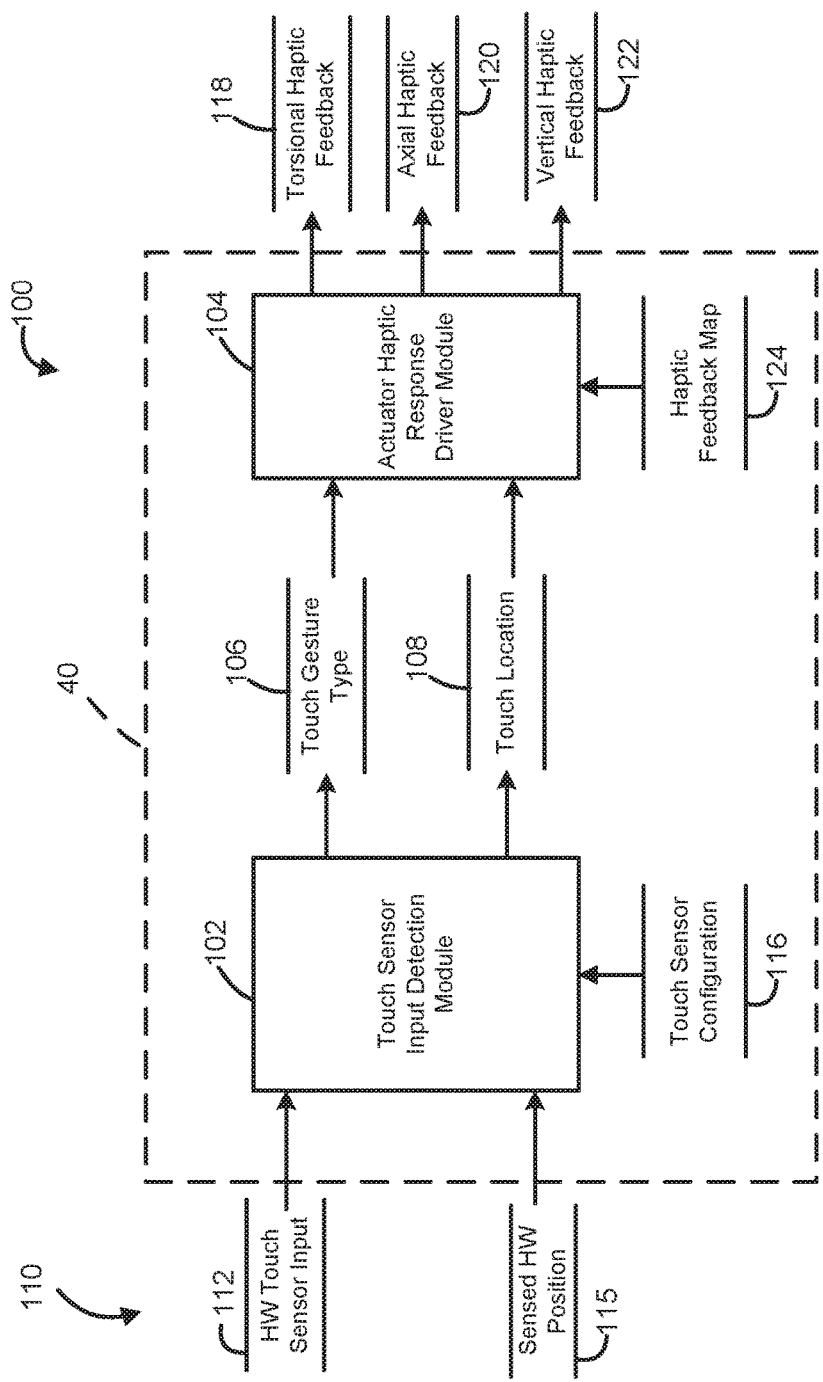
FIG. 4 illustrates a system for haptic feedback for steering system controls in accordance with some embodiments.

FIG. 4 illustrates a system 100 for haptic feedback for steering system controls according to an embodiment. The system 100 includes control module 40 and receives data from one or more of the touch sensors 35 (FIGS. 1-3). In various embodiments, the control module 40 can include one or more sub-modules and datastores, such as a touch sensor input detection module 102 and an actuator haptic response driver module 104. As used herein the terms module and sub-module refer to an application specific integrated circuit (ASIC), an electronic circuit, a processor (shared, dedicated, or group) and memory that executes one or more software or firmware programs, a combinational logic circuit, or other suitable components that provide the described functionality. As can be appreciated, the control module 40 shown in FIG. 4 may be further partitioned and include additional control elements known in the art of steering control systems. For instance, the control module 40 or other module (not depicted) of the vehicle 10 of FIG. 1 can implement known techniques for steering control of the steering system 12, 12A of FIGS. 1 and 2.

Inputs to the control module 40 may be generated from the sensors 33 and 35 (FIGS. 1-3) of the vehicle 10 (FIG. 1) as well as other sensors (not depicted). In addition, inputs may be received from other control modules (not shown) within the vehicle 10 (FIG. 1). Touch sensor input 110 can include handwheel sensor input 112 from one or more of the handwheel touch sensors 35A-35G (FIG. 3) of steering system 12, 12A (FIGS. 1 and 2). The touch sensor input detection module 102 acquires the touch sensor input 110 and identifies a touch gesture type 106 of the touch sensor input 110. The touch sensor input detection module 102 can also determine a touch location 108 of the touch gesture type 106, such as a specific position/region on the handwheel 14 (FIGS. 1-3). A touch sensor configuration 116 can define configuration information regarding mapping of specific touch sensors 35 to locations on the handwheel 14. In some embodiments, a sensed handwheel position 115 (e.g., an angular position) is also received at the touch sensor input detection module 102 from the handwheel position/velocity sensor 33 to adjust a reference frame of the handwheel touch sensors 35A-35G relative to a current position of the handwheel 14. For instance, vertical haptic feedback 122 can be provided in response to a tapping gesture on the handwheel touch sensor 35A or 35C if rotation of the handwheel 14 places handwheel touch sensor 35A or 35C at the twelve o'clock position. Alternatively, the reference frame of the handwheel touch sensors 35A-35G can remain fixed for generating haptic feedback regardless of the current position of the handwheel 14.

The actuator haptic response driver module 104 determines a desired haptic feedback associated with the touch gesture type 106 and controls a steering system actuator 19, 21, and/or 23 to produce a haptic response based on the desired haptic feedback. The actuator haptic response driver module 104 can also determine the desired haptic feedback based on the touch location 108. The actuator haptic response driver module 104 can select between one or more of: a torsional haptic feedback 118, an axial haptic feedback 120, and a vertical haptic feedback 122 as the desired haptic feedback based on indexing the touch gesture type 106 and the touch location 108 with respect to a haptic feedback map 124. For instance, a tapping motion at one location on the handwheel 14 may result in outputting axial haptic feedback 120, and the same tapping motion at a different location on the handwheel 14 may result in outputting vertical haptic feedback 122. Similarly, a sliding motion across the rim 17 of the handwheel 14 may result in outputting torsional haptic feedback 118, while an upward or downward sliding motion on the hub 13 of the handwheel 14 may result in outputting vertical haptic feedback 122. It will be understood that many variations and combinations are possible beyond the examples provided herein.

The torsional haptic feedback 118 can add a torsional acceleration to output of the steering actuator motor 19 (FIGS. 1 and 2). The axial haptic feedback 120 can add an axial acceleration to output of the telescope actuator 21 (FIG. 2). The vertical haptic feedback 122 can add a vertical acceleration to output of the rake actuator 23 (FIG. 2). The magnitude of acceleration can be fixed or vary based on a sensed force level detected with the touch type gesture 106 at the handwheel touch sensors 35. Other aspects of the haptic feedback 118-122 can also vary based on the touch gesture type 106, such as a tapping gesture versus a sliding gesture, and aspects of the responses can be defined in the haptic feedback map 124.

Figure 5:
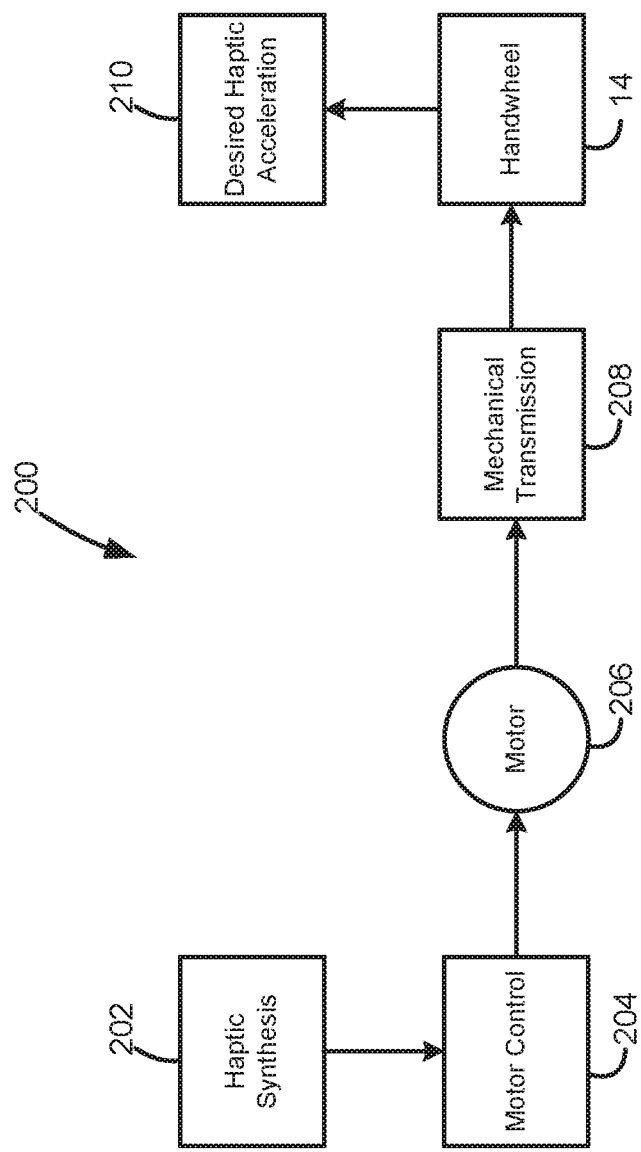
FIG. 5 illustrates a haptic feedback path for transmitting a desired haptic acceleration through a steering system in accordance with some embodiments.

FIG. 5 illustrates a haptic feedback path 200 for transmitting a desired haptic acceleration through a steering system and is described in further reference to FIGS. 1-4. The haptic feedback path 200 can be incorporated in the steering system 12, 12A. Haptic synthesis 202 defines control signals for a motor control 204 to apply to a motor 206, for instance, using inverse plant models of electromechanical dynamics of the steering system 12, 12A. To reach a desired haptic acceleration 210 at handwheel 14, the haptic synthesis 202 accounts for electrical and mechanical response properties of the motor control 204, the motor 206 (e.g., steering actuator motor 19, telescope actuator 21, or rake actuator 23), mechanical transmission 208 (e.g., steering shaft 16), and the handwheel 14. Thus, the haptic synthesis 202 used for the torsional haptic feedback 118, the axial haptic feedback 120, and the vertical haptic feedback 122 can be customized for each desired response based on the characteristics specific to each actuator 19, 21, 23 and its respective mounting location. Definitions for haptic synthesis 202 can be stored in the haptic feedback map 124, for instance, as control system settings or functions.

Figure 6:
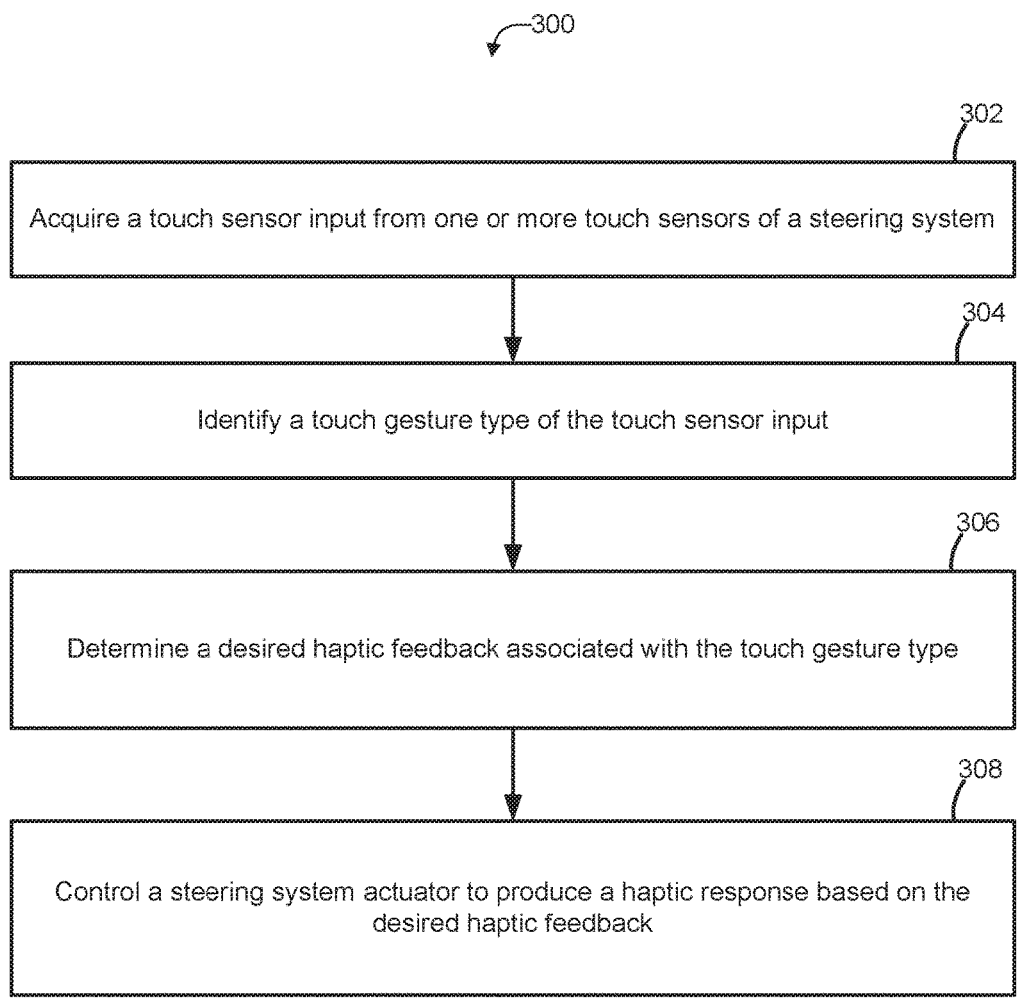
FIG. 6 illustrates a process for haptic feedback for steering system controls in accordance with some embodiments.

FIG. 6 illustrates a process 300 for haptic feedback for steering system controls. Process 300 is described in further reference to FIGS. 1-5. The process 300 can be performed by the control module 40 of FIGS. 1 and 4. At block 302, the control module 40 acquires a touch sensor input 110 from one or more touch sensors 35 of a steering system 12, 12A. At block 304, a touch gesture type 106 of the touch sensor input 110 is identified. The touch gesture type 106 can distinguish between a tapping motion detected by the one or more touch sensors 35 and a sliding motion detected by the one or more touch sensors 35. At block 306, a desired haptic feedback associated with the touch gesture type 106 is determined. At block 308, a steering system actuator 19, 21, and/or 23 is controlled to produce a haptic response based on the desired haptic feedback. The control module 40 can also determine a touch location 108 of the touch gesture type 106, and the desired haptic feedback can be based on the touch location 108. The haptic response can be a desired haptic acceleration 210 characterized by one or more of the torsional haptic feedback 118, the axial haptic feedback 120, and/or the vertical haptic feedback 122.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system for haptic feedback for steering system controls, the system comprising:
    a touch sensor input detection module that acquires a touch sensor input from one or more touch sensors of a steering system, identifies a touch gesture type of the touch sensor input, and determines a touch location of the touch gesture type; and
    an actuator haptic response driver module that determines a desired haptic feedback based on indexing the touch gesture type and the touch location with respect to a haptic feedback map and controls a steering system actuator to produce a haptic response based on the desired haptic feedback.

2. The system of claim 1, wherein the actuator haptic response driver module selects between one or more of: a torsional haptic feedback, an axial haptic feedback, and a vertical haptic feedback as the desired haptic feedback.

3. The system of claim 2, wherein the steering system actuator comprises one or more of: a steering actuator motor, a telescope actuator, and a rake actuator, and further wherein the torsional haptic feedback adds a torsional acceleration to output of the steering actuator motor, the axial haptic feedback adds an axial acceleration to output of the telescope actuator, and the vertical haptic feedback adds a vertical acceleration to output of the rake actuator.

4. The system of claim 3, wherein actuator plant dynamics of one or more of the steering actuator motor, the telescope actuator, and the rake actuator are used to synthesize the desired haptic feedback.

5. The system of claim 1, wherein the one or more touch sensors comprise one or more of: a handwheel rim-mounted touch sensor, a handwheel spoke-mounted touch sensor, and a handwheel hub-mounted touch sensor.

6. The system of claim 1, wherein the touch gesture type distinguishes between a tapping motion detected by the one or more touch sensors and a sliding motion detected by the one or more touch sensors.

7. A steering system comprising:
one or more touch sensors;
a steering system actuator; and
a control module operable to acquire a touch sensor input from the one or more touch sensors, identify a touch gesture type of the touch sensor input, determine a touch location of the touch gesture type, determine a desired haptic feedback based on indexing the touch gesture type and the touch location with respect to a haptic feedback map, and control the steering system actuator to produce a haptic response based on the desired haptic feedback.

8. The steering system of claim 7, wherein the control module is operable to select between one or more of: a torsional haptic feedback, an axial haptic feedback, and a vertical haptic feedback as the desired haptic feedback.

9. The steering system of claim 8, wherein the steering system actuator comprises one or more of: a steering actuator motor, a telescope actuator, and a rake actuator, and further wherein the torsional haptic feedback adds a torsional acceleration to output of the steering actuator motor, the axial haptic feedback adds an axial acceleration to output of the telescope actuator, and the vertical haptic feedback adds a vertical acceleration to output of the rake actuator.

10. The steering system of claim 9, wherein actuator plant dynamics of one or more of the steering actuator motor, the telescope actuator, and the rake actuator are used to synthesize the desired haptic feedback.

11. The steering system of claim 7, wherein the one or more touch sensors comprise one or more of: a handwheel rim-mounted touch sensor, a handwheel spoke-mounted touch sensor, and a handwheel hub-mounted touch sensor.

12. The steering system of claim 7, wherein the touch gesture type distinguishes between a tapping motion detected by the one or more touch sensors and a sliding motion detected by the one or more touch sensors.

13. A method for haptic feedback for steering system controls, the method comprising:
acquiring, by a control module, a touch sensor input from one or more touch sensors of a steering system;
identifying a touch gesture type of the touch sensor input;
determining a touch location of the touch gesture type;
determining a desired haptic feedback based on indexing the touch gesture type and the touch location with respect to a haptic feedback map; and
controlling a steering system actuator to produce a haptic response based on the desired haptic feedback.

14. The method of claim 13, further comprising selecting between one or more of: a torsional haptic feedback, an axial haptic feedback, and a vertical haptic feedback as the desired haptic feedback.

15. The method of claim 14, wherein the steering system actuator comprises one or more of: a steering actuator motor, a telescope actuator, and a rake actuator, and further wherein the torsional haptic feedback adds a torsional acceleration to output of the steering actuator motor, the axial haptic feedback adds an axial acceleration to output of the telescope actuator, and the vertical haptic feedback adds a vertical acceleration to output of the rake actuator, wherein actuator plant dynamics of one or more of the steering actuator motor, the telescope actuator, and the rake actuator are used to synthesize the desired haptic feedback.

16. The method of claim 13, wherein the one or more touch sensors comprise one or more of: a handwheel rim-mounted touch sensor, a handwheel spoke-mounted touch sensor, and a handwheel hub-mounted touch sensor.

17. The method of claim 13, wherein the touch gesture type distinguishes between a tapping motion detected by the one or more touch sensors and a sliding motion detected by the one or more touch sensors.

* * * * *